(12) United States Patent
Decore et al.

(10) Patent No.: US 6,513,289 B1
(45) Date of Patent: Feb. 4, 2003

(54) RETAINING CLIP FOR TRUNKING, IN PARTICULAR TRUNKING FOR ELECTRICAL DEVICES

(75) Inventors: Bertrand Decore, La Chapelle Saint Aubin (FR); Raphael Decore, Parennes (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 09/686,952

(22) Filed: Oct. 16, 2000

(30) Foreign Application Priority Data

Oct. 18, 1999 (FR) .............................. 99 12965

(51) Int. Cl.⁷ ................................. E04B 2/00
(52) U.S. Cl. ................ 52/288.1; 52/717.01; 52/718.01; 52/220.1; 174/135; 174/48; 174/49; 174/60; 174/68.3; 174/99 R; 174/66 R; 16/268; 16/225; 385/100; 385/134
(58) Field of Search .......................... 24/546, 547, 570, 24/462; 312/223.6; 174/135, 48, 49, 60, 68.3, 99 R, 66 R; 248/68.1, 69, 222.11, 222.52, 222.51; 52/242, 717.01, 716.5, 716.6, 717.05, 718.01, 718.04, 287.1, 288.1, 220.5, 220.1; 16/268, 225; 385/100, 134

(56) References Cited

U.S. PATENT DOCUMENTS

| | | | | |
|---|---|---|---|---|
| 3,786,171 A | * | 1/1974 | Shira | 174/48 |
| 4,592,265 A | * | 6/1986 | Steinberger | 84/327 |
| 4,942,271 A | * | 7/1990 | Corsi et al. | 174/101 |
| 4,998,389 A | * | 3/1991 | Pritts | 52/900 |
| 5,134,250 A | * | 7/1992 | Caveney et al. | 174/101 |
| 5,235,136 A | * | 8/1993 | Santucci et al. | 174/68.3 |
| 5,274,194 A | * | 12/1993 | Belcher | 174/50 |
| 5,435,606 A | * | 7/1995 | Navazo | 285/121 |
| 5,728,976 A | * | 3/1998 | Santucci et al. | 174/135 |
| 5,898,132 A | * | 4/1999 | Lee | 174/101 |
| 6,084,180 A | * | 7/2000 | DeBartolo, Jr. et al. | 174/95 |
| 6,321,923 B1 | * | 11/2001 | Wood | 215/235 |
| 6,323,421 B1 | * | 11/2001 | Pawson et al. | 174/48 |

FOREIGN PATENT DOCUMENTS

| | | |
|---|---|---|
| DE | 24 15 768 | 10/1975 |
| EP | 0 838 885 | 4/1998 |
| WO | WO 98/10499 | 3/1998 |

* cited by examiner

*Primary Examiner*—Lanna Mai
*Assistant Examiner*—Dennis L. Dorsey
(74) *Attorney, Agent, or Firm*—Young & Thompson (57) ABSTRACT

A retaining clip for trunking includes a fixing base attached locally to a longitudinal wall of a base section of the trunking, such as an internal partition thereof, and a retaining flap which is articulated to the fixing base and can move from a standby position, in which it allows unrestricted access to the underlying interior volume of the base section, to a service position, in which it closes that interior volume at least partly, extending substantially transversely relative to it. The retaining clip includes, independently of any member or component of the base section or of the trunking, a releasable locking system for locking the retaining flap in its service position. Applications include trunking for electrical devices.

24 Claims, 7 Drawing Sheets

RETAINING CLIP FOR TRUNKING, IN PARTICULAR TRUNKING FOR ELECTRICAL DEVICES

BACKGROUND OF THE INVENTION

1. Field of the Invention

The present invention relates generally to fitting out trunking of the type used to house and protect various devices, in particular electrical devices, and to house and protect cables, conductors or other lines to which they are connected.

2. Description of the Prior Art

Hereinafter, in the usual way, the term "trunking" refers to the combination of a base section, which has an open cross section, and at least one cover section, which is adapted to be attached to the base section, for example clipped to it, to close it.

The base section usually has a back which is adapted to be attached to some kind of support, for example an inside or outside wall, one or more longitudinal walls, for example a lateral flange when its cross section is U-shaped or L-shaped, and at least one fixed or removable internal partition if its internal volume is divided transversely into two or more compartments.

The present invention relates more particularly to retaining clips for use with trunking of the above kind and which are adapted to be attached transversely to the base section of the trunking, from place to place, to close locally and at least partly at least one of the compartments of the base section, in order temporarily to retain cables or conductors placed in the compartment or already present therein pending fitting of the corresponding cover section, or while it is removed.

The retaining clips are of two kinds.

The first kind of retaining clip extends cantilever-fashion from any longitudinal wall of the base section.

This is the case, for example, in German patent No. 24 15 768, in which the longitudinal wall in question is a rim on a lateral flange of the base section and parallel to its back.

However, in the above German patent application, each retaining clip is essentially no more than a simple flap rotatably mounted on the longitudinal wall.

Apart from the fact that rotary mounting is suitable only for trunking whose base section is designed accordingly, it cannot provide stable retention of the retaining clips in the various positions that they can assume.

Retaining clips of the second type extend from one to the other of two longitudinal walls of the base section, which is therefore used to hold them in position.

This is the case, for example, in German patent application No. 2 326 348 in which, as previously, the retaining clips are essentially no more than a flap articulated to one of the two longitudinal walls of the base section concerned, but are additionally provided with a clip for releasably locking them to the other longitudinal wall, which incorporates an opening for this purpose, in this case a keyhole shaped opening, into which the clip is inserted.

Apart from the fact that the provision of the spaced openings in the base section can hardly fail to complicate its manufacture considerably, the retaining clips are relatively difficult to handle and fit.

This problem is aggravated by the fact that the retaining clips have to slide parallel to their rotation axis for their clip to engage in the narrower part of the corresponding opening in the base section.

In published French patent application No. 2 651 387, which is concerned with a cover section joint rather than a retaining clip, the retaining clips are substantially rigid parts requiring temporary deformation of the base section to fit them, the two longitudinal walls of the base section between which they extend having to be spread apart to enable them to be clipped to them.

Substantially the same can be said of German patent application No. 34 41 377.

Published international patent application No. WO98/10499 describes a retaining clip adapted to extend from one to the other of two longitudinal walls of the base section of the trunking.

However, in published international patent application No. WO98/10499, the retaining clip includes a fixing base adapted to be attached locally to one of the longitudinal walls and a retaining flap which is articulated to the fixing base and can move between a standby position, in which it provides unrestricted access to the underlying interior volume of the base section, and a service position, in which it closes the interior volume at least partly, interengaging with the other of the longitudinal walls concerned of the base section, in practice clipping to it.

Accordingly, in international patent application No. WO98/10499, the retaining flap of the retaining clip must have its length adapted to the width of the compartment(s) of the base section to be closed and, to hold the retaining flap in a stable service position, the base section must itself be adapted to enable the necessary clipping action.

Finally, in European patent application No. 0 838 885, clipping is advantageously avoided, and in the service position the free end of the retaining flap of the retaining clip, i.e. the end opposite the fixing base, merely engages behind a longitudinal wall of the base section of the trunking, in this instance the rim of one of the lateral flanges of the base section, and bears on that longitudinal wall.

However, as previously, the length of the retaining flap must be adapted to the width of the compartment(s) to be closed.

Finally, moving it to the service position requires temporary deformation of the base section, which makes using the system complicated.

A general object of the present invention is an arrangement which avoids the various drawbacks referred to above, in a very simple manner.

SUMMARY OF THE INVENTION

To be more precise, it provides a retaining clip for trunking, of the kind including, on the one hand, a fixing base adapted to be attached locally to any longitudinal wall of the base section of such trunking, such as an internal partition or a lateral flange of the base section, for example, and, on the other hand, a retaining flap which is articulated to the fixing base and can therefore move from a standby position, in which it allows unrestricted access to the underlying interior volume of the base section, to a service position, in which it closes that interior volume at least partly, then extending substantially transversely relative to it, including, independently of any member or component of the base section or of the trunking, releasable locking means for locking the retaining flap in its service position.

In other words, in accordance with the invention, the retaining flap is held in a stable service position without the base section to which the retaining clip is attached having to interact in any way with the end of the retaining flap opposite the fixing base.

The locking means are advantageously adapted to create a sticking point on the trajectory of the retaining flap on respective opposite sides of which said retaining flap is stable in its service and standby positions.

For example, the autonomous releasable locking means include at least one locking bead projecting from the fixing base and at least one locking tongue on the retaining flap which is in corresponding relationship to the aforementioned locking bead and adapted to be moved from one side of the locking bead to the other to engage under it.

Be this as it may, whilst being able to extend, if required, from one to the other of two longitudinal walls of the base section of the trunking, the retaining clip according to the invention in practice extends cantilever-fashion from one of the longitudinal walls and, despite the resulting overhang, is advantageously capable of holding its retaining flap in a stable service position, thanks to the autonomous releasable locking means with which it is equipped for this purpose in accordance with the invention.

Accordingly, an advantageous compromise is achieved between allowing an overhang of a retaining clip of the above kind, so that its retaining flap can have a length independent of the width of the compartment(s) to be closed, and stable retention of the retaining flap in the service position, with no risk of it rotating unintentionally if the cables or conductors in the compartment(s) it closes apply a force to it in the direction that would otherwise open it.

In a different embodiment, the releasable locking means of the retaining flap include a bistable hinge which passes through a sticking point between two stable positions of the retaining flap, i.e. its service position and its standby position.

The bistable hinge advantageously forms spring return means for the retaining flap operative between the sticking point and its original stable position.

Furthermore, the retaining clip according to the invention does not rely on the base section to which it is attached to hold its retaining flap in the service position, and therefore has the advantage of being particularly fast and simple to use.

Finally, requiring no adaptation of the base section to hold the retaining flap, it has the advantage of being adapted to be fitted in a quasi-universal manner to base sections of different kinds, which widens its field of application.

The features and advantages of the invention will emerge further from the following description, which is given by way of example, and with reference to the accompanying diagrammatic drawings.

DETAILED DESCRIPTION OF THE PREFERRED EMBODIMENTS

First of all, note that identical or similar parts of the various embodiments shown in the various figures are identified by the same reference symbols, as far as possible, and are not described again each time.

FIGS. 1 and 9 to 13 show trunking 10 including, in the usual way, a base section 11, which has an open cross section, and at least one cover section 12A, 12B which is adapted to be attached to the base section 11 to close it.

In the embodiment shown, the interior volume of the trunking 10, and therefore that of its base section 11, is divided transversely into parallel and contiguous top and bottom longitudinal compartments 13A, 13B which extend along its entire length.

Two parallel and contiguous cover sections 12A, 12B are therefore provided in this embodiment, one for each compartment 13A, 13B.

Figure 1:
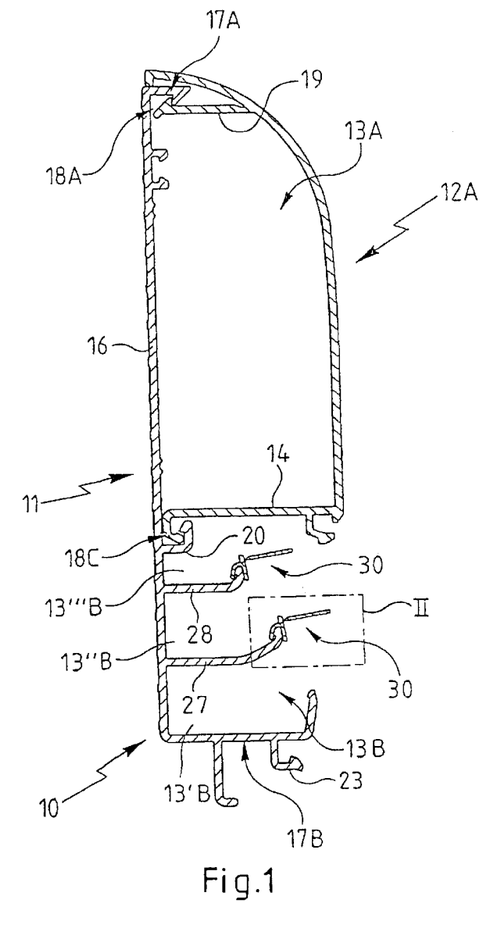
FIG. 1 is a view in cross section of trunking equipped with a first embodiment of a retaining clip according to the invention, omitting the cover section associated with the compartment in which the retaining clips are operative, and showing the retaining flap of the retaining clip in the standby position.
Figure 12:
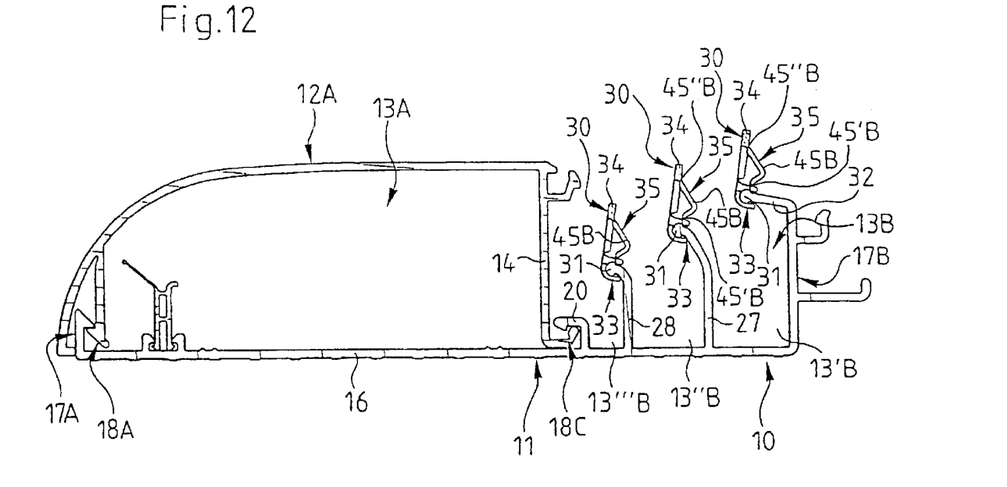
FIG. 12 is a view in cross section of the trunking shown in FIG. 10

In FIGS. 1 and 12 one of the cover sections 12A, 12B is omitted, in this instance the cover section 12B associated with the bottom compartment 13B, for reasons that will emerge below.

In practice, the two compartments 13A, 13B are separated from each other by a partition 14.

In the embodiment shown, the partition 14 is part of one of the cover sections 12A, 12B, for example, as shown here, the cover section 12A associated with the top compartment 13A.

This embodiment of the base section 11 has a substantially flat back 16, adapted to be attached to some kind of support, not shown, and two lateral flanges 17A, 17B. This is known in the art.

In the embodiment shown, the lateral flanges 17A, 17B are different heights and the top lateral flange 17A is much shorter than the bottom lateral flange 17B.

Clipping means 18A, 18C operative between the cover section 12A and the base section 11 retain the cover section 12A associated with the top compartment 13A.

The clipping means 18A are operative between the top lateral flange 17A of the base section 11 and a tongue 19 projecting for this purpose from the inside surface of the cover section 12A.

The clipping means 18C are operative between the partition 14 and a bracket 20 projecting for this purpose from the back 16 of the base section 11.

Clipping means 21B, 21D are provided for retaining the cover section 12B associated with the bottom compartment 13B.

Figure 9:
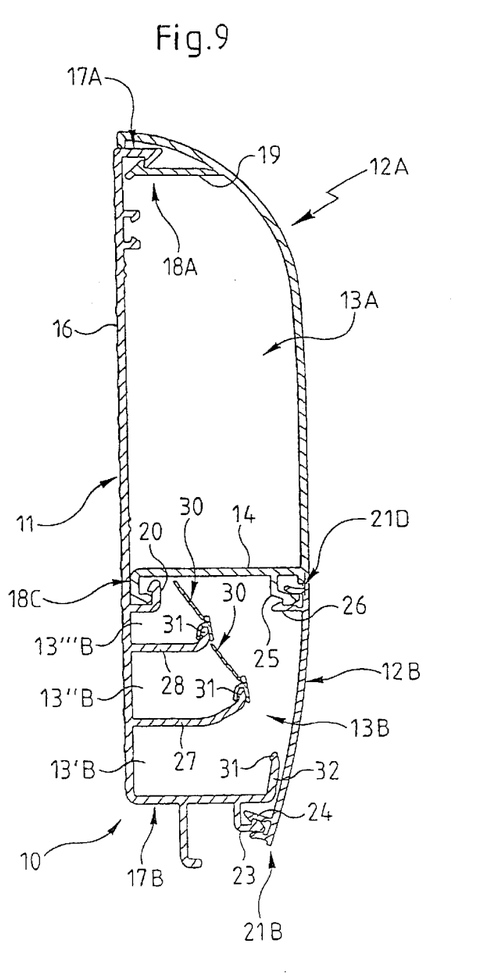
FIG. 9 is a view in cross section similar to that of FIG. 1 showing the trunking fitted with the cover section associated with the compartment in which the retaining clips are operative and the retaining flap in the service position.
Figure 13:
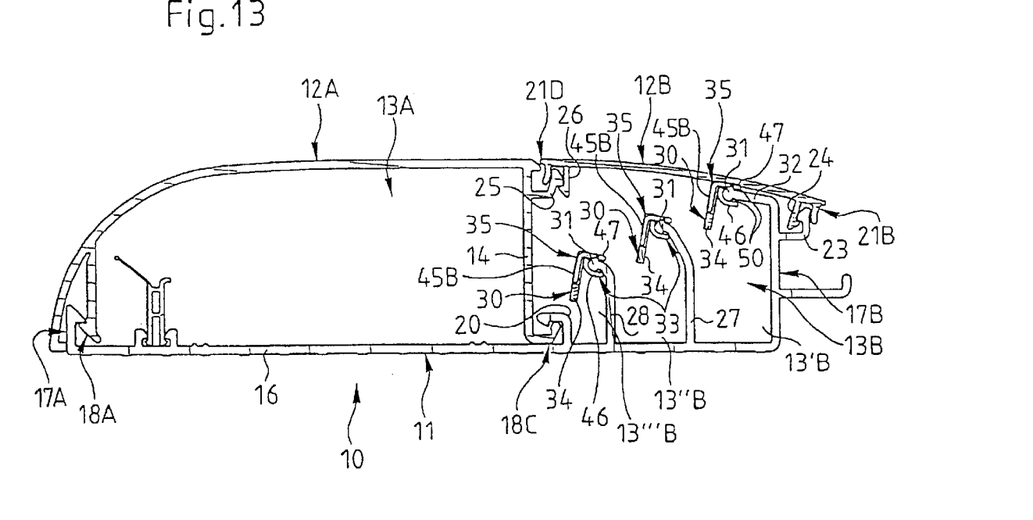
FIG. 13 is a view in cross section of the trunking shown in FIG. 11
Figure 14:
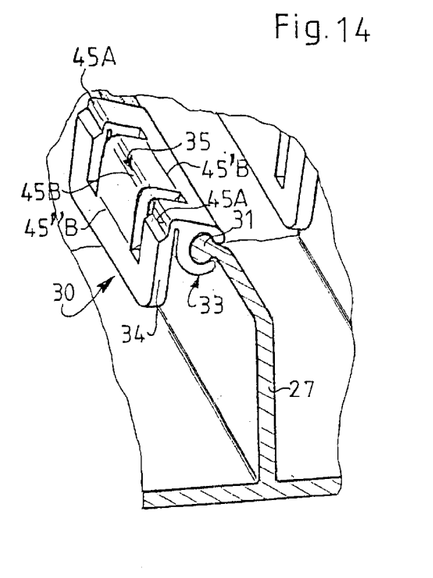
FIG. 14 is an enlarged fragment of FIG. 11.
Figure 15:
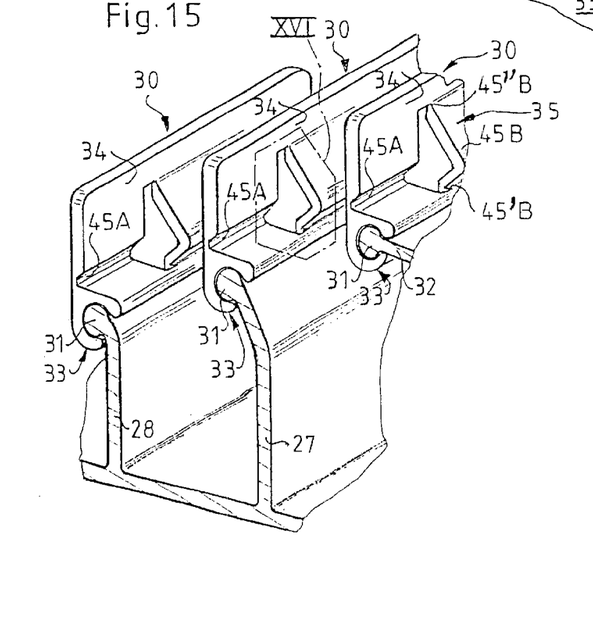
FIG. 15 is an enlarged fragmentary perspective view of the parts in the position of FIGS. 10 and 12.
Figure 16:
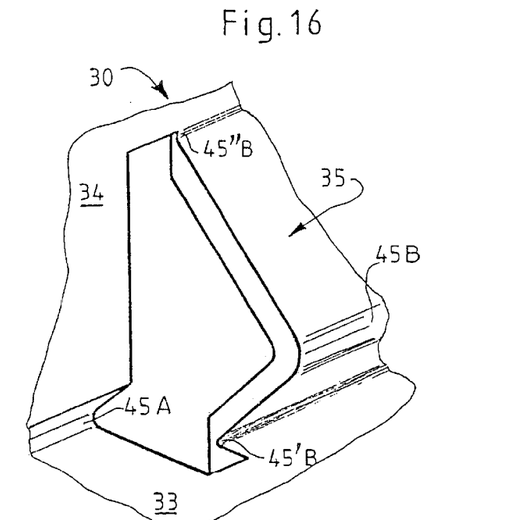
FIG. 16 is an enlargement of the detail XVI in FIG. 15.

FIGS. 9 and 13 show that the clipping means 21B are operative between a bracket 23 projecting for this purpose from the outside surface of the bottom lateral flange 17B of the base section 11 and a tongue 24 projecting for this purpose from the inside surface of the cover section 12B.

The clipping means 21D are operative between a bracket 25 projecting for this purpose from the outside surface of the partition 14 and a tongue 26 projecting for this purpose from the inside surface of the cover section 12B and parallel to the previous tongue 24.

The foregoing arrangements are not described in more detail here because they are well known in the art and/or not relevant to the present invention.

One of the compartments 13A, 13B of the trunking 10, for example the top compartment 13A, is dedicated to the installation of some kind of device, for example some kind of electrical device, not shown, and the other of the compartments 13A, 13B, and thus the bottom compartment 13B in this case, is dedicated to the installation of cables or conductors, also not shown, to which the devices are connected. This is also known in the art.

In the embodiment shown, the bottom compartment 13B is divided transversely into subcompartments 13'B, 13"B, 13'"B for separating the cables or conductors in them from each other, since the cables or conductors can carry current at different voltages, for example.

In practice, it is divided by internal partitions 27, 28 fastened to the back 16 of the base section 11 and globally parallel to its lateral flanges 17A, 17B.

As shown here, for example, the internal partitions 27, 28 are in one piece with the back 16 of the base section 11.

In the embodiments shown, they are different heights, the internal partition 27 nearest the bottom lateral flange 17B being higher than the internal partition 28 farthest from it.

The trunking 10 is equipped inside its bottom compartment 13B with retaining clips 30 for temporarily retaining any cables or conductors present in the bottom compartment 13B pending fitting of the cover section 12B associated therewith, or while the cover section 12B is removed. This is also known in the art.

As shown here, for example, retaining clips 30 are provided from place to place on both longitudinal walls of the base section 11 consisting of the internal partitions 27, 28, to retain any cables or conductors present in the sub-compartments 13"B and 13'"B above them.

To this end, in the embodiment shown, each of the internal partitions 27, 28 has a longitudinal hook 31 running along its free edge.

Of course, retaining clips 30 can also be attached from place to place to the longitudinal wall consisting of the lateral flange 17B to retain any cables or conductors present in the sub-compartment 13'B above the bottom lateral flange 17B of the base section 11.

To this end, in this embodiment, the lateral flange 17B also has a longitudinal hook 31 similar to the previously mentioned hooks 31 running along the free edge of an inwardly directed rim 32.

The various retaining clips 30 are preferably identical.

Thus only one of the retaining clips 30 is described hereinafter.

Figure 10:
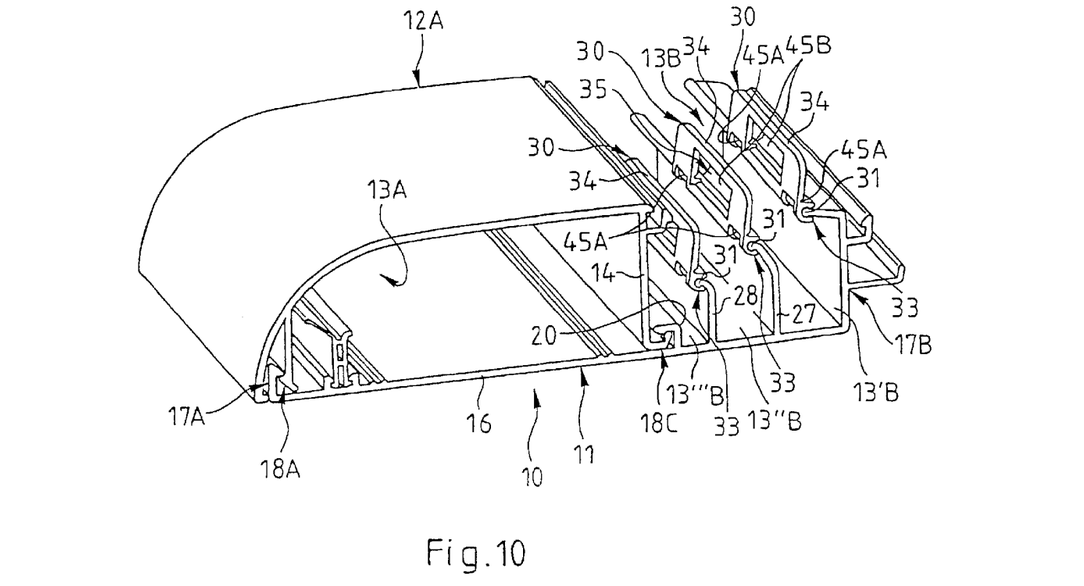
FIG. 10 is a perspective view of trunking equipped with a second embodiment of a retaining clip according to the invention, showing the retaining flap in the standby position.
Figure 11:
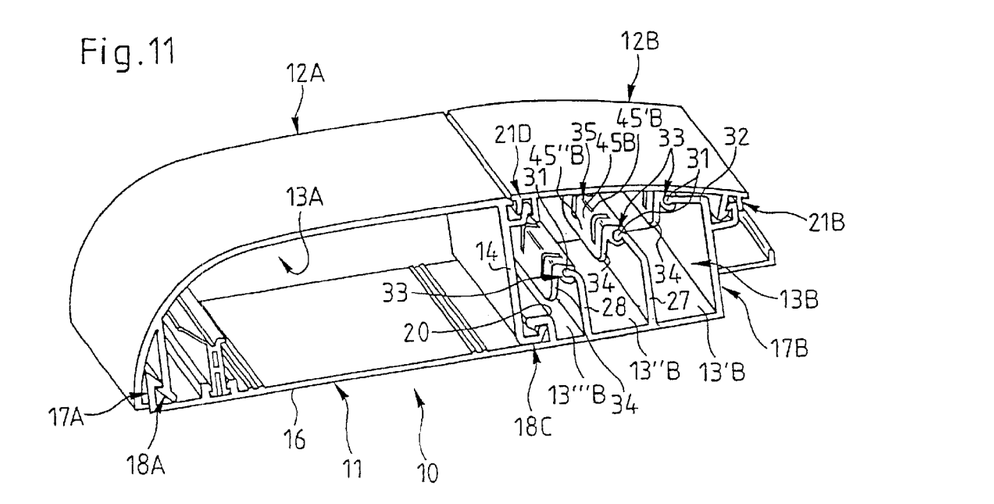
FIG. 11 is a perspective view similar to that of FIG. 10 showing the trunking fitted with the cover section associated with the compartment in which the retaining clips are operative and the retaining flap in the service position.

The retaining clip 30 includes a fixing base 33 adapted to be attached locally to any longitudinal wall of the base section 11 of the trunking 10, as described in more detail later, and in this instance to one of the internal partitions 27, 28 of the base section 11 or its bottom lateral flange 17B, and a retaining flap 34 which is articulated to the fixing base 33 and which can be moved between a standby position in which, as shown in FIGS. 1, 10 and 12, it provides unrestricted access to the underlying interior volume of the base section 11, in this instance that of the sub-compartments 13'B, 13'"B alone, for example, and a service position in which, as shown in FIGS. 9, 11 and 13, it closes the interior volume at least partly, extending substantially transversely to it. All this is known in the art.

According to the invention, the retaining clip 30 includes autonomously, i.e. independently of the base section 11 of the trunking 10, and independently of any part or component of the base section 11 or the trunking 10, releasable locking means 35 associated with the retaining flap 34 and adapted to hold it in the service position.

To be more precise, the locking means 35 are adapted to create on the trajectory of the retaining flap 34 a sticking point or a non-return point on respective opposite sides of which the retaining flap 34 is stable in its service position (see FIGS. 9, 11 and 13) or standby position (see FIGS. 1, 10 and 12).

Figure 2:
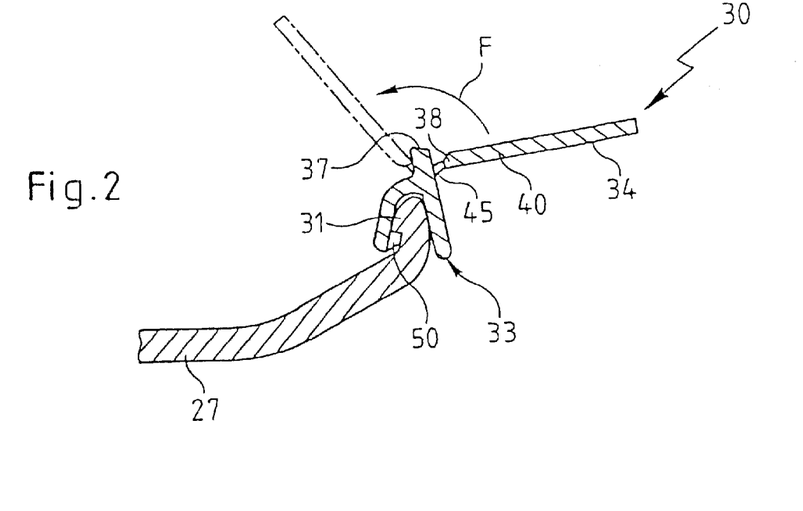
FIG. 2 shows the detail II of FIG. 1 to a larger scale.

In the embodiment shown in FIGS. 1 to 9, the releasable locking means 35 associated with the retaining flap 34 include at least one locking bead 37 projecting from the fixing base 33 and, in corresponding relationship with the aforementioned locking bead 37, at least one locking tongue 38 on the retaining flap 34 which can be moved from one side to the other of the locking bead 37 and can therefore engage under it, as shown in dashed outline in FIG. 2.

The locking bead 37 forms an abutment which the locking tongue 38 can pass over between the two stable positions of the retaining flap 34, i.e. its service position and its standby position. A sticking point is created on the trajectory of the retaining flap 34 where the locking tongue 38 passes over this abutment.

Accordingly, in this typical instance, the sticking point or non-return point between the two stable positions of the retaining flap 34 is formed by the abutting cooperation of the locking bead 37 and the locking tongue 38.

As is the case in the embodiment shown, the releasable locking means 35 associated with the retaining flap 34 preferably include at least two spaced locking beads 37 on the fixing base 33 and, in corresponding relationship with the locking beads 37, the same number of locking tongues 38 on the retaining flap 34.

As shown here, for example, there are only two locking beads 37 and two locking tongues 38.

In practice the locking beads 37 are on the side of the fixing base 33 facing towards the retaining flap 34 and the locking tongues 38 extend along the longitudinal edge of the retaining flap 34 nearest the fixing base 33.

In the embodiment shown, the locking beads 37 take the form of simple ribs.

As shown here, however, to facilitate the movement of the retaining flap 34 from its standby position to its service position, the edge surface 39 of the locking beads 37 is preferably at least partly oblique on the standby position side of the retaining flap 34.

As shown here, for example, the entire edge surface 39 of the locking beads 37 is oblique, from the service position of the retaining flap 34 to its standby position.

In other words, the edge of the edge surface 39 of the locking beads 37 farthest from the retaining flap 34 is at a greater distance from the fixing base 33 than its edge nearest the retaining flap 34.

Both edge surfaces are preferably rounded, as shown here, of course.

In the embodiment shown, each locking tongue 38 is formed by the free end of a locking lug 40 which is part of the retaining flap 34 and elastically deformable relative to it.

In practice, the locking lugs 40 forming the locking tongues 38 are in the plane of the retaining flap 34, and the sides of each of them are individually defined by two slots 41 in the flap.

Figures 6, 7, 8:
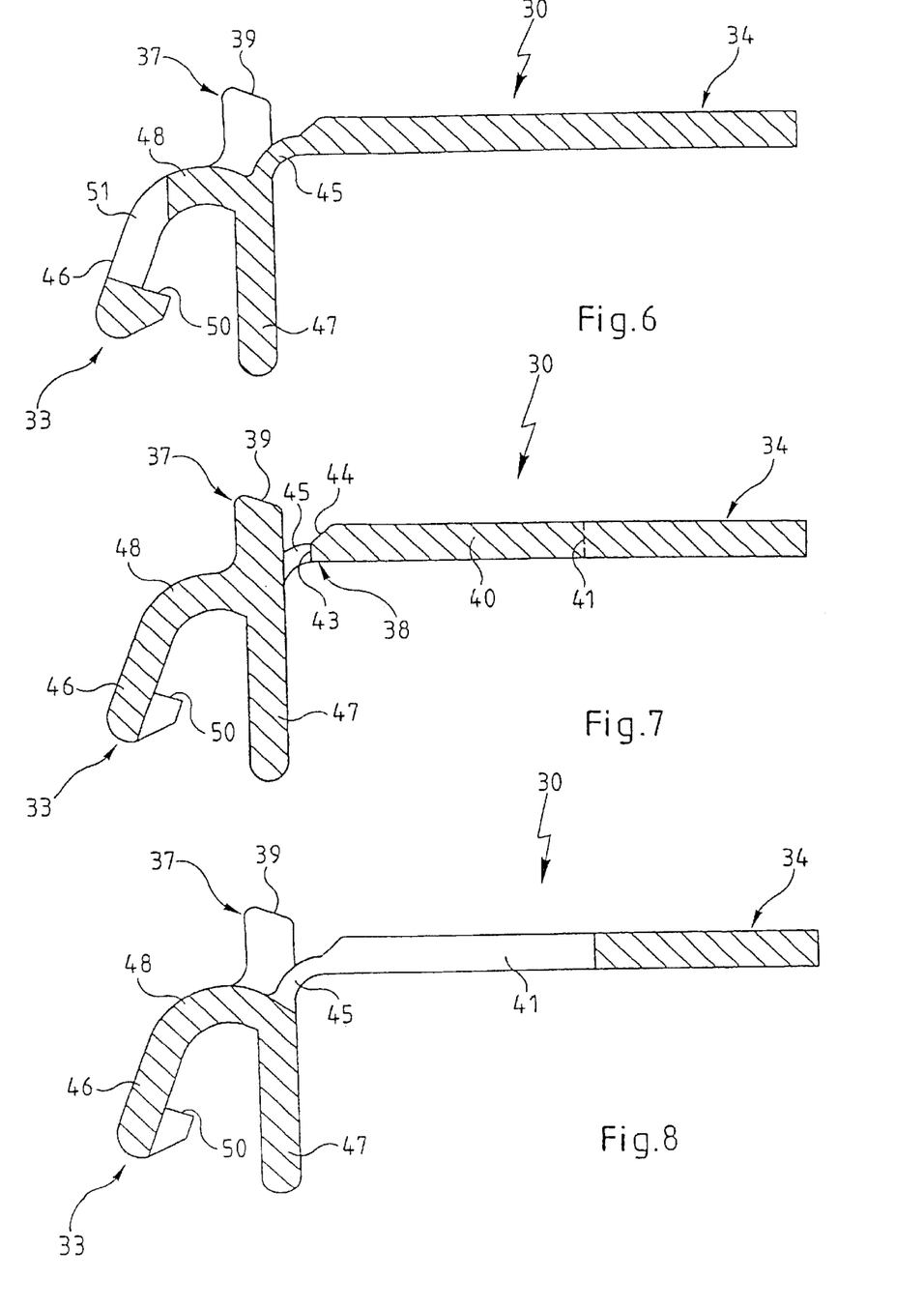
FIGS. 6, 7 and 8 are views of the clip to a larger scale and in cross section taken along the respective lines VI—VI, VII—VII and VIII—VIII in FIG. 4.

As shown here, to facilitate the movement of the retaining flap 34 from its standby position to its service position, as previously, the edge surface 43 of the locking tongue 38 preferably has a chamfer 44 on the same side as the locking bead 37, as can be seen clearly for one of them in FIG. 7.

In the embodiments shown, the retaining flap 34 is articulated to the fixing base 33 by at least one integral hinge 45, the whole being molded in one piece.

As shown here, the retaining clip 30 according to the invention preferably includes a plurality of spaced hinges 45 alternating with the locking beads 37.

As shown here, for example, there are three hinges 45.

Each locking bead 37 therefore lies between two hinges 45.

In the embodiment shown, each hinge 45 is formed by a thinner web connecting the retaining flap 34 continuously to the fixing base 33.

In the embodiment shown, the fixing base 33 has a generally U-shaped cross section with two flanges 46, 47 connected by a rounded middle area 48 and the locking beads 37 project from the back of the middle area 48.

To be more precise, in this embodiment, one of the flanges 46, 47 of the fixing base 33, in this instance the flange 47 nearest the retaining flap 34, is substantially plane and the locking beads 37 are substantially continuous with it, at the corresponding end of the middle area 48.

For attaching the retaining clip 30 to one longitudinal wall of the base section 11 of the trunking 10, in this instance one of the internal partitions 27, 28 of the base section 11 or its bottom lateral flange 17B, in the embodiment shown the fixing base 33 includes at least one clip 50 adapted to cooperate with and retain the hook 31 of a longitudinal wall of this kind.

As is the case in the embodiment shown, the fixing base 33 preferably includes a plurality of spaced clips 50, three clips in this example, each of which is in corresponding relationship to a respective hinge 45.

In practice, the clips 50 project from the inside surface of one of the flanges 46, 47 of the fixing base 33.

To be more precise, they project from the inside surface of whichever of the flanges 46, 47 of the fixing base 33 is opposite that with which the locking beads 37 are continuous.

Thus in this example they are on the flange 46 of the fixing base 33 farthest from the retaining flap 34.

To facilitate molding of the clips 50 projecting from its inside surface, the flange 46 has an aperture 51 in it in line with each of the clips 50.

As shown in FIGS. 6 to 8, for example, a retaining clip 30 according to the invention is molded with the retaining flap 34 in the standby position.

The retaining clip 30 shown in FIGS. 1 to 9 is then ready for use.

Figure 3:
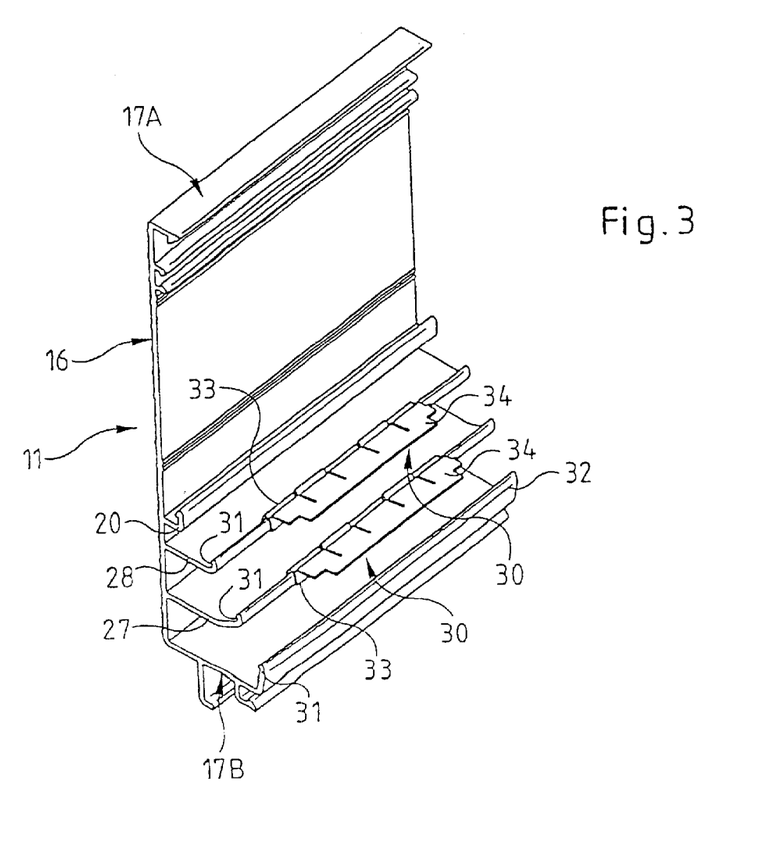
FIG. 3 is a perspective view of the base section of the trunking shown in FIG. 1 and the corresponding retaining clips.
Figure 4:
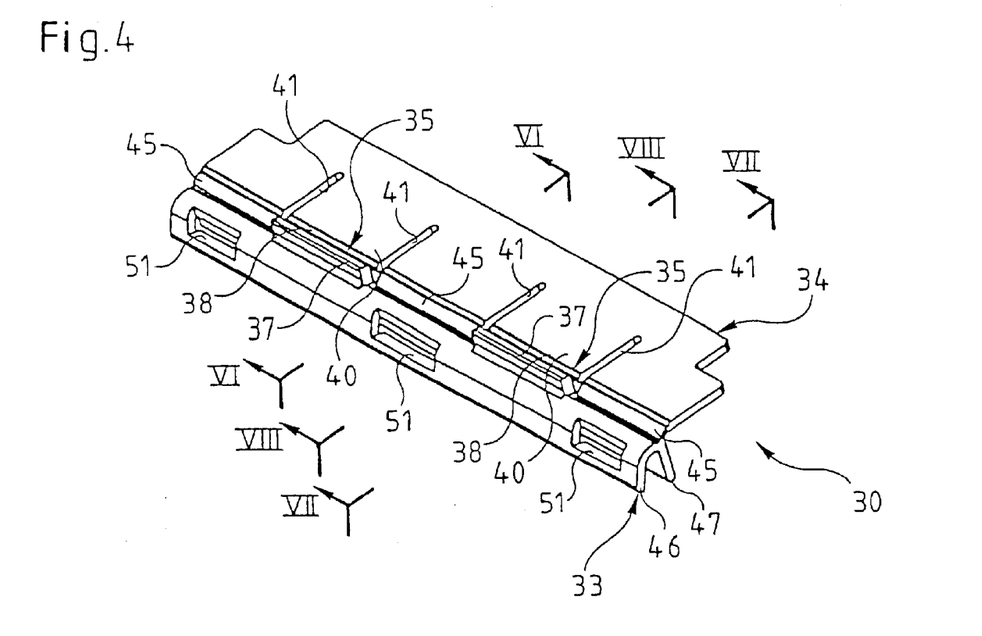
FIG. 4 is a perspective view to a larger scale of one of the retaining clips, seen from above.
Figure 5:
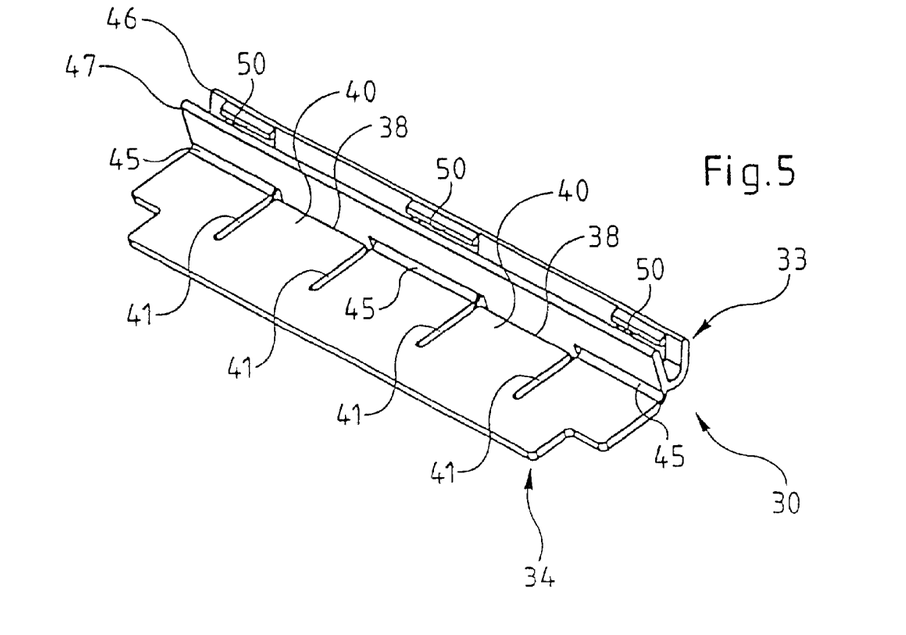
FIG. 5 is perspective view of the retaining clip, seen from below.

To use it, it is sufficient to attach it to the longitudinal wall of the base section 11 by simply clipping its fixing base 33 to the hook 31 of the latter, as shown in FIGS. 1 to 3.

As shown in continuous outline in FIGS. 1 to 3, the retaining flap 34 then extends away from the bottom 16 of the base section 11, providing the required unrestricted access to its interior volume.

The locking beads 37 of the retaining clip 30 according to the invention then extend over this interior volume, or to be more precise over the interior volume to be closed, in this instance that of the subcompartments 13"B, 13'"B of the trunking 10.

To move the retaining flap 34 from its standby position to it service position, it is sufficient to pivot it relative to the fixing base 33, by means of the hinges 45, and as shown by the arrow F in FIG. 2, until the locking tongues 38 engage under the locking beads 37, by virtue of temporary elastic deformation of the locking lugs 38, possibly accompanied by temporary elastic deformation of the hinges 45, the tongues passing over the sticking point or the point of non-return on moving past the abutment formed by the locking beads.

In the resulting service position the retaining flap 34 of the retaining clip 30 according to the invention entirely overhangs the fixing base 33, as in the preceding standby position, without there necessarily being any cooperation with any longitudinal wall of the base section 11 of the trunking 10 or with any other component of the base section 11 or of the trunking 10 on the side of the retaining flap 34 opposite the fixing base 33.

The locking beads 37 oppose return movement of the retaining flap 34 to the standby position, and the service position of the retaining flap 34 is therefore perfectly stable.

Because the fixing base 33 and the longitudinal wall concerned of the base section 11 are clipped together, unintentional rotation of the retaining clip 30 according to the invention is prevented, even if the cables or conductors that it retains apply thrust to its retaining flap 34.

This clipping therefore advantageously contributes to proper retention of the assembly on the base section 11.

The retaining flap 34 can be moved to the standby position, if required.

All that is required to bring this about is to pivot it in the opposite direction.

In the embodiment shown in FIGS. 10 to 13, the releasable locking means 35 associated with the retaining flap 34 include a bistable hinge 45B which passes over a sticking point or a point of non-return between two stable positions of the retaining flap 34, i.e. its service position and its standby position.

The bistable hinge 45B is between two pivot hinges 45A enabling pivoting of the retaining flap 34.

The hinges 45A take the form of a thinner web of the material of which the retaining clip 30 is made.

According to one advantageous feature of the invention, the bistable hinge 45B also forms return spring means for the retaining flap 34 between the sticking point and its original stable position.

The bistable hinge 45B consists of a portion of the retaining flap 34 in the form of an angle bracket, of which one hinged end 45"B is attached to the retaining flap 34 and the other hinged end 45'B is attached to the fixing base 33, the two hinged ends 45'"B and 45'B being formed by a thinner web.

To be more precise, the two hinged ends 45'B, 45'"B are formed so that, in the standby position of the flap, their curvatures are oriented in opposite directions, the hinged end 45"B attached to the retaining flap being merely a pivot hinge whereas the hinged end 45'B attached to the fixing base 33 is conformed to be "closed" in the two stable positions of the retaining flap, so rendering said bistable hinge 45B bistable.

As shown in FIGS. 10 and 12 in particular, when the retaining flap 34 is in the standby position, the bistable hinge 45B projects to the rear of the plane of said retaining flap 34, its hinged end 45'B connected to the fixing base 33 then being "closed" or bent against the fixing base 33 to hold the retaining flap 34 in the stable standby position.

As shown in FIGS. 11 and 13 in particular, when the retaining clip 30 is in the service position, the bistable hinge 45B is partly in the plane of the retaining flap 34, forming a connection between the retaining flap 34 and a plane flange 47 of the fixing base 33, the hinged end 45'B of the bistable hinge 45 being also "closed" or bent against the fixing base 33.

On the trajectory of the retaining flap 34 between its two stable positions, i.e. its service position and its standby position, the hinged end 45'B "opens" or extends between the original stable position of the retaining flap and the sticking point and then, after passing over the sticking point, closes to bring the retaining flap to its destination stable position.

The hinged end 45'B of the bistable hinge 45B also forms return spring means for the retaining flap between the sticking point and its original stable position.

As in the previous embodiment shown in FIGS. 1 to 9, the fixing base 33 has a generally U-shaped cross section with two flanges 46, 47 connected by a rounded middle area.

One flange 47 of the fixing base 33 is substantially plane and the bistable hinge 45B has a part substantially continuous with it.

The bistable hinge 45B is connected to the substantially plane flange 47 of the fixing base 33 by the hinged end 45'B.

To attach the retaining clip 30 to a longitudinal wall of the base section 11 of the trunking 10, in this instance one of the internal partitions 27, 28 of the base section 11 or its bottom lateral flange 17B, the fixing base 33 includes, in the embodiment shown in FIGS. 10 to 13, at least two clips 50 facing each other and adapted to cooperate with and retain a double hook 31 on one such longitudinal wall.

In practice, the clips 50 project from the inside surface of the flanges 46, 47 of the fixing base 33.

In this example, the retaining clip 30 is made in one piece from a plastics material, of course.

Of course, the present invention is not limited to the embodiment described and shown, but encompasses any variant execution thereof, in particular with regard to the fixing base enabling the retaining clip according to the invention to be attached to a longitudinal wall of the base section of the trunking, which fixing base can have a configuration different to that specifically described and shown, depending in particular on the configuration of the longitudinal wall itself.

What is claimed is:

1. A retaining clip for trunking including a clipping portion adapted to be attached locally to any longitudinal wall of a base section of such trunking, and a retaining flap which is articulated to said clipping portion and can therefore move from a standby position in which it allows unrestricted access to the underlying interior volume of said base section to a service position in which it closes that interior volume at least partly, said retaining clip including, independently of any member or component of said base section, releasable locking means for locking said retaining flap in said service position.

2. The retaining clip claimed in claim 1, wherein said locking means are adapted to create a sticking point on the trajectory of said retaining flap on respective opposite sides of which said retaining flap is stable in its service and standby positions.

3. The retaining clip claimed in claim 1, wherein said releasable locking means associated with said retaining flap include at least one locking bead projecting from said fixing base and at least one locking tongue on said retaining flap and in corresponding relationship to the aforementioned locking bead, adapted to move from one side to the other on that locking bead, and thereby adapted to engage under said locking bead.

4. The retaining clip claimed in claim 3, wherein said locking bead is on a side of said fixing base facing towards said retaining flap.

5. The retaining clip claimed in claim 3, wherein an edge surface of said locking bead is at least partly oblique on the standby position side of said locking flap.

6. The retaining clip claimed in claim 5, wherein the entire edge surface of said locking bead is oblique from said service position of said retaining flap to its standby position.

7. The retaining clip claimed in claim 1, wherein said locking tongue is formed by the free end of a clip which is part of said retaining flap and elastically deformable relative to said retaining flap.

8. The retaining clip claimed in claim 7, wherein said clip is in the plane of said retaining flap and its sides are individually defined by two slots in said flap.

9. The retaining clip claimed in claim 1, wherein said retaining flap is articulated to said fixing base by at least one integral hinge.

10. The retaining clip claimed in claim 9, wherein said hinge is formed by a thin web.

11. The retaining clip claimed in claim 1, wherein said releasable locking means associated with said retaining flap include at least two spaced locking beads on said fixing base and the same number of locking tongues in corresponding relationship to said locking beads on said retaining flap.

12. The retaining clip claimed in claim 9, wherein said releasable locking means associated with said retaining flap include at least two spaced locking beads on said fixing base and the same number of locking tongues in corresponding relationship to said locking beads on said retaining flap, said clip including a plurality of spaced hinges alternating with said locking beads.

13. The retaining clip claimed in claim 1, wherein said fixing base has a U-shaped cross section with two flanges connected by a middle area and said locking bead or each locking bead projects from a back of said middle area.

14. The retaining clip claimed in claim 13, wherein one of said flanges of said fixing base is substantially plane and said locking bead or each locking bead is substantially continuous with said one flange.

15. The retaining clip claimed in claim 1, wherein said releasable locking means of said retaining flap include a bistable hinge providing a sticking point between two stable positions of said retaining flap to define respectively a service position and a standby position.

16. The retaining clip claimed in claim 15, wherein said bistable hinge forms return spring means for said retaining flap between said sticking point and an original stable position.

17. The retaining clip claimed in claim 15, wherein said bistable hinge is between two pivot hinges of said retaining flap.

18. The retaining clip claimed in claim 15, wherein said bistable hinge is a part of said retaining flap in the form of an angle bracket of which one hinged end is attached to said retaining flap and another hinged end renders said bistable hinge bistable and is attached to said fixing base, said two hinged ends being formed by a thin web.

19. The retaining clip claimed in claim 1, wherein said fixing base includes at least one clip.

20. The retaining clip claimed in claim 19, wherein said clip projects from an inside surface of one of said flanges of said fixing base.

21. The retaining clip claimed in claim 20, wherein said fixing base includes at least two facing clips projecting from an inside surface of said flanges of said fixing base.

22. The retaining clip claimed in claim 14, wherein said clip projects from an inside surface of whichever of said flanges of said fixing base is opposite the flange with which said locking bead or each locking bead is continuous.

23. The retaining clip claimed in claim 20, wherein said fixing base includes a plurality of spaced clips, each of which corresponds to a respective hinge.

24. A trunking which comprises a base section including a longitudinal wall, and a retaining clip including a clipping portion attached locally to said longitudinal wall and a retaining flap articulated to said clipping portion, said retaining flap being able to move between a standby position and a service position, wherein said retaining clip includes releasable locking means for locking said retaining flap in a service position, said releasable locking means being independent of said base section.

* * * * *